Aug. 28, 1962

K. HENRICHSEN 3,051,194

TEMPERATURE COMPENSATED SPRING-BIASED
LINEAR HYDRAULIC DEVICE

Filed May 6, 1958

*INVENTOR.*
KNUT HENRICHSEN

BY
Charles F. Dieckler

ATTORNEY

INVENTOR.
KNUT HENRICHSEN

United States Patent Office 3,051,194
Patented Aug. 28, 1962

3,051,194
TEMPERATURE COMPENSATED SPRING-BIASED
LINEAR HYDRAULIC DEVICE
Knut Henrichsen, Los Angeles, Calif., assignor to
North American Aviation, Inc.
Filed May 6, 1958, Ser. No. 733,408
9 Claims. (Cl. 137—468)

This application relates to fluid pressure actuated devices having linear motion and more particularly it relates to a temperature compensated valve for operation in high temperature environments.

Accordingly, it is an object of this invention to provide a device that is axially movable substantially in proportion to an applied fluid pressure and independent of temperature changes.

Another object is the provision of a means for compensating for an increase in the rate of deflection of a piston-biasing spring due to temperature induced changes in the modulus of elasticity of the spring material with increasing temperatures.

It is another object to provide a valve having a built-in temperature compensating means to provide a constant pressure discharge regardless of the operating fluid temperatures or the environment temperature in which the valve is located.

Yet, a still further object is to provide a pressure sensitive pump governor valve that is temperature compensated to provide a truly constant pump discharge pressure regardless of the demand on the pump and the operating temperature conditions of the pump. The unique manner in which the spring-loaded governor valve is compensated for changes in temperature, which cause the rate of deflection of the spring to vary, is an important feature of this invention. The novel construction of this valve, by utilizing opposed pistons, further allows the use of a smaller, lighter and more sensitive valve biasing spring with its attendant advantages.

These and other objects and advantages of the present invention will become apparent to those skilled in the art after reading the present specification and the accompanying drawings forming a part thereof, in which.

Figure 3:
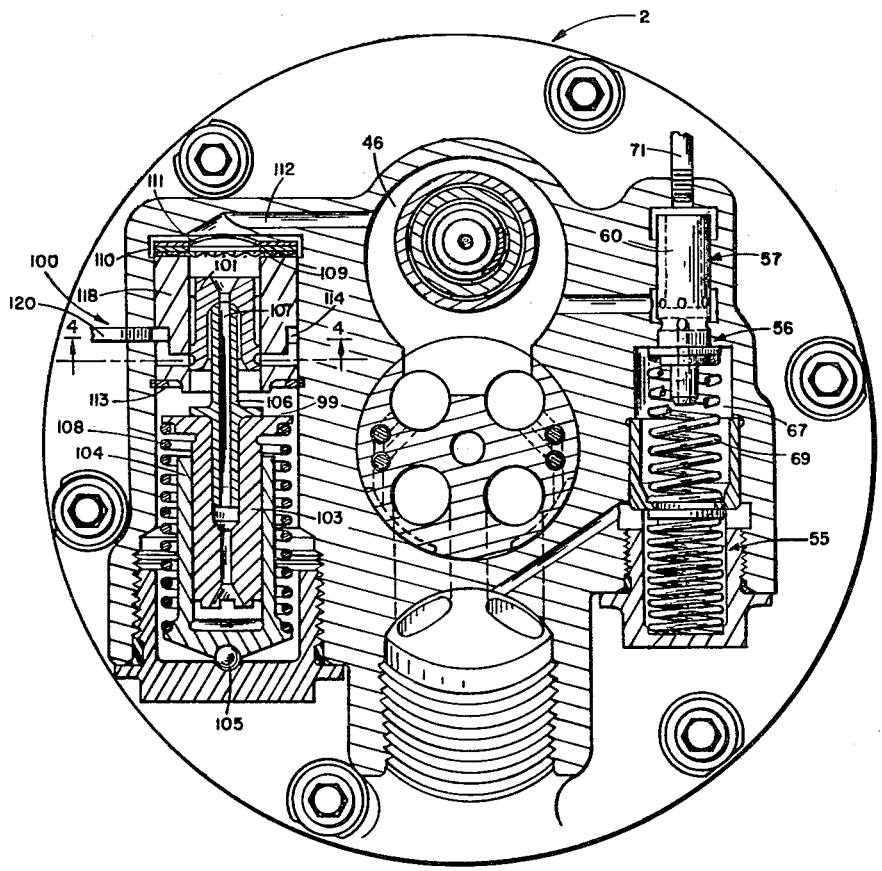
Figure 4:
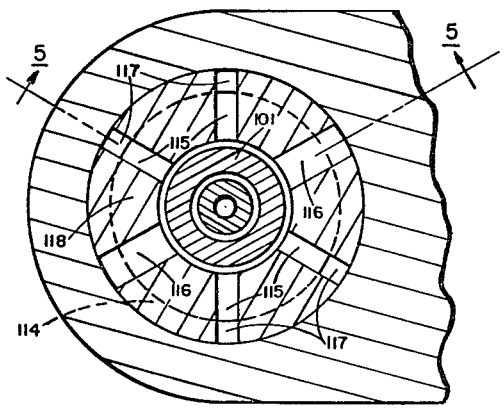
Figure 5:
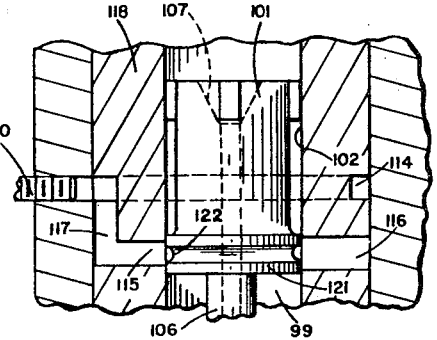

FIG. 3 is a transverse sectional view taken across the valve end of a high speed radial piston rotary pump showing a temperature compensated governor valve, in accordance with the present invention, for controlling the eccentricity of the pump reaction ring slipper race in accordance with the pump demand. The built-in purge valve, constant pressure valve and case drain bypass valve of such a pump are also clearly illustrated by this figure;

FIG. 4 is a transverse sectional view of the governor valve structure taken in the plane of line 4—4 in FIG. 3; and FIG. 5 is a longitudinal section through the governor valve structure taken in the planes of line 5—5 in FIG. 4.

Figure 1:
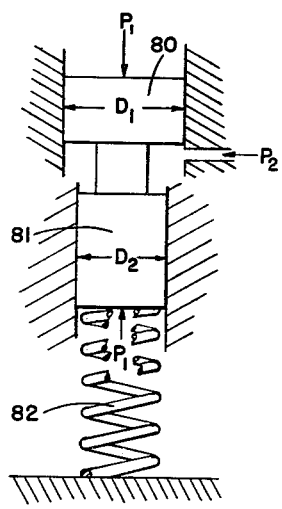
FIG. 1 is a schematic representation of a spring-loaded opposed piston mechanism in accordance with the present invention for effecting linear axial movement thereof in response to a variable applied pressure.

Referring specifically to the drawings wherein like reference characters have been used throughout the several views to designate like parts, the principle of operation of the device of this invention will be explained first by reference to the schematic representation shown in FIG. 1. As illustrated therein, a first piston 80 is operatively connected to a second piston 81. Piston 80 has a diameter $D_1$ that is larger than the diameter $D_2$ of piston 81. The two pistons are of different materials with piston 80 having a thermal coefficient of expansion $\mu_1$ that is less than the thermal coefficient of expansion $\mu_2$ for piston 81. It has been found that forming piston 80 of steel and piston 81 of aluminum provides the necessary differential rate of expansion of the two pistons, however, any two suitably different materials may be utilized for this purpose. The basic concept of temperature compensation for a spring-loaded axially displaceable member resides in having two pistons of different diameters in opposed relationship with the piston having the smaller diameter being spring-loaded in opposition to the larger diameter piston with both pistons being subjected to the same fluid pressure on their distal surfaces. It is, of course, essential that each piston cylinder be of the same material as its associated piston to prevent differential expansion of these members. As the rate of deflection of spring 82 increases with increasing temperature, the biasing spring force decreases. The rate of spring deflection is herein defined as inches deflection per pound of applied axial force. To maintain the displacement of the movable opposed pistons as a linear function of the applied pressure, this decrease in spring force must be corrected for by increasing the area of the smaller diameter piston 81 relative to that of the larger diameter piston 80, in a manner whereby the decreased spring force is compensated for by the decrease in the differential pressure acting on the opposed piston. Stated in another way, the net piston area of the opposed pistons is caused to decrease in proportion to the increase in the spring deflection rate with increasing temperature. This result is obtained by proper proportioning of the diameters of the pistons in view of their different coefficients of expansion and of the temperature effect on the modulus of elasticity of the spring.

The spring material modulus of elasticity at a temperature $\Delta T$ above a base temperature may be found from the expression $E=E_1(1-K_1\Delta T)$ wherein E is the modulus of elasticity at the elevated temperature $\Delta T$ above the base temperature, $E_1$ is the modulus of elasticity at the base temperature and $K_1$ is a function of the spring material and is assumed to be constant over the temperature range under consideration. The force W acting on the spring 82 due to differential expansion of the two piston members may be computed from the following formula:

$$W = P\frac{\pi}{4}[D_1^2(1+\mu_1\Delta T)^2 - D_2^2(1+\mu_2\Delta T)^2]$$

$$W \cong P\frac{\pi}{4}[D_1^2(1+2\mu_1\Delta T) - D_2^2(1+2\mu_2\Delta T)]$$

where $P=P_1-P_2$, the difference between high pressure $P_1$ and a lower pressure $P_2$. The spring deflection $\delta$ may be given by the the formula $$\delta = K_2\frac{W}{E}$$

where $K_2$ is a constant dependent on the dimensions of the spring. For perfect temperature compensation this spring deflection $\delta$ must be independent of the termperature rise $\Delta T$, therefore:

$$\frac{\partial \delta}{\partial \Delta T}=0 \text{ and } E\frac{\partial W}{\partial \Delta T}=W\frac{\partial E}{\partial \Delta T}$$

From this it follows that $$K_1(D_1^2-D_2^2)=2(\mu_2 D_2^2-\mu_1 D_1^2)$$

which may be rewritten as $$D_2=D_1\sqrt{\frac{K_1+2\mu_1}{K_1+2\mu_2}}$$

From this formula the piston diameters may be proportioned to give substantially perfect temperature compensation since the spring's modulus of elasticity is also a linear function of temperature.

By way of an example, consider that the diameter of piston 80 ($D_1$) is 0.5 inch and that $\mu_1$ for the steel piston $6 \times 10^{-6}$. The thermal coefficient of expansion $\mu_2$ for aluminum is $12 \times 10^{-6}$. Assuming a loss of ten percent stiffness in the spring material for a 400° F. temperature rise $K_1 = 1/400 = 0.00025$. Then $D_2 = 0.488925$ inch and $D_1 - D_2 = 0.011075$ inch.

Figure 2:
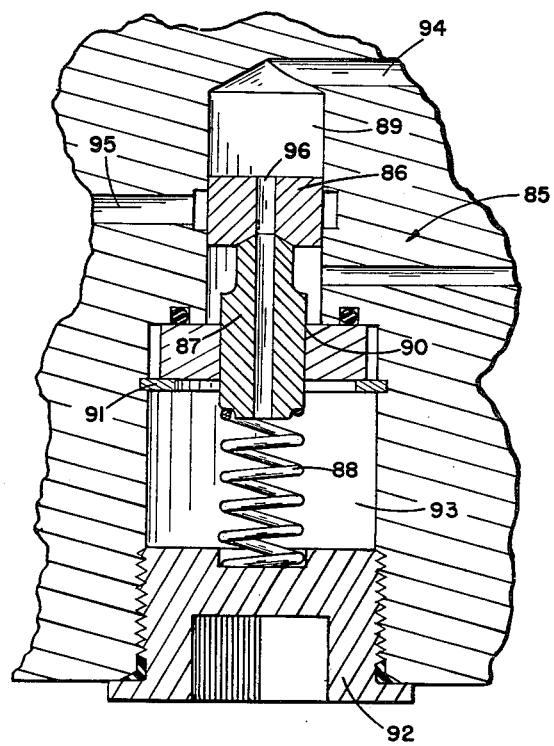
FIG. 2 is an embodiment of the temperature-compensated spring-loaded device of this invention, utilized as a control valve, and illustrated in a simplified manner for purposes of explanation.

As shown in FIG. 2 a temperature compensated device for producing a uniform axial displacement which is substantially linearly proportional to the applied hydraulic load is herein utilized as a valve means 85. In this embodiment, a body member forms the cylinder 89 for the piston 86 and is of the same kind of material to minimize temperature expansion differences therebetween. A piston cylinder 90 for housing second piston 87 is positioned within the body member by means of a retainer ring 91. Piston cylinder 90 is of the same material as second piston 87, in this case, aluminum. A continuous conduit 96 through both pistons 86 and 87 allows application of the fluid pressure to the distal surfaces of the pistons. A plug 92 closes the bottom of the chamber 93 and supports spring 88. When used thus as a valve, piston 86 also acts as a valve lobe. Under the influence of high pressure hydraulic fluid entering through inlet passage 94, the opposed pistons are forced down on the spring until the lobe of piston 86 clears outlet passage 95 and permits throttled flow into this passage at a rate that is dependent on the applied high pressure fluid but independent of temperature variations.

The valve of the present invention finds particular application in a variable displacement radial piston rotary pump of the type described in my copending divisional applications Serial Nos. 845,671 and 848,946, wherein the slipper race or reaction ring which controls the piston stroke is of a unique floating type controlled by the application of a fluid pressure differential on opposite sides of such slipper race.

Referring to FIG. 3, a slightly different embodiment of the invention is used as a temperature compensated governor means 100 for controlling the eccentricity of the slipper race of a variable displacement radial piston rotary type pump 2 to control the pump discharge regardless of temperature variations or rises. This figure also illustrates the bypass valve 55, purge valve 56 and constant pressure valve 57 utilized in a pump of the stated type. Constant pressure is transmitted through conduit 71 to the slipper race chamber to provide for controlling the eccentricity of the reaction ring in conjunction with governor valve 100. By means of this valve structure, the eccentricity of the slipper race may be varied in accordance with the discharge pressure to achieve constant pump discharge characteristics regardless of the temperature of the fluids in the pump or the environmental ambient temperature in which the pump is operating. As shown herein, a steel piston 101 is axially displaceable within a piston chamber 102 formed in steel cylinder body 118, which is mounted within a cylindrical chamber 99 by means of a retainer ring 113. Piston 101 herein acts as a valve member as above-described, with valve lobe 121 movable in accordance with the pump discharge pressure, which is applied through an inlet passage 112, to provide a variable pressure to the pump slipper race chamber with which it is operatively connected by conduit 120. An aluminum cylinder 104 is pivotally mounted on a ball 105 at the lower end of governor chamber 99 for automatic alignment with upper piston 101. An aluminum piston 103 is slidably mounted within aluminum cylinder 104 and is interconnected with piston 101 by means of a rigid spacer member 106 with a spring 108 biasing the piston assembly in opposition to the net pressure force applied to the two opposed pistons. Steel piston 101, the interconnecting member 106 and the aluminum piston 103, all have a connecting axial bore therein forming a passage 107 to allow communication of the high pressure fluid introduced through passageway 112 from the pump high pressure discharge chamber 46 to act on the lower surface of piston 103, as well as on the upper surface of piston 101. The respective diameters of the aluminum piston 103 and steel piston 101 are proportioned relative to the spring modulus of elasticity in the manner outlined above. This allows operation of the pump and attainment of the rated capacity at all temperatures within a greatly increased temperature range. To prevent the introduction into the governor of foreign solid particles of excessive size that may be carried in the hydraulic fluid, a screen 109 is positioned at the inlet to the cylinder 102. This is held in place by means of washer 110 and a Marcel spring 111.

Referring to FIGS. 4 and 5, an enlarged view is presented of the system of conduits and ports connecting the governor piston chamber 102 with the slipper race ring chamber for assuring fine control and close selectivity of the quick positive response of the governor and slipper race reaction ring without hunting or oscillating of the system. As shown therein a plurality of relatively small radially extending conduits 115 are formed in cylinder body member 118 to interconnect the cylinder chamber 102 and annular manifold chamber 114 by vertical passages 117 at their outer end. A lesser number of somewhat larger radially extending conduits 116 are also positioned within cylinder body 118 but do not communicate direcently with the annular chamber 114. These latter conduits, however, do connect with conduit 115 by means of an annular groove 122 in the valve lobe 121 during a portion of the valve travel. Conduits 116 are a few thousandths of an inch greater in their vertical extent about a common transverse center plane than conduits 115. For the sake of clarity, this is shown on an exaggerated scale in FIG. 5. This arrangement provides an attenuation of the governor valve action by providing a restrictive throttling action at each end of the valve opening and closing stroke movement. Thus, as the valve moves downward under the action of increased discharge pressure, the valve lobe first uncovers radial conduits 116. The fluid then flows through the restricted annular groove 122 into conduits 115, 117, chamber 114 and thence to the pump reaction ring chamber. Continued downward piston travel uncovers conduits 115 and allows a greatly increased rate of flow to be communicated to the reaction ring chamber. Upon upward movement of the valve, a flow reversal takes place with fluid from the reaction ring chamber flowing through conduit 120, chamber 114 and conduits 117 and 115 and thence into governor chamber 99, which connects with the case outlet fluid line by a conduit not shown. A similar attenuation of the flow then takes place as valve lobe 121 covers conduit 115 with conduit 116 still being in communication with the reaction ring chamber by means of groove 122 and permitting a restricted flow therethrough and thence into chamber 99 for the last few thousandths of an inch of downward valve travel. This valve structure provides a sharp cut-off characteristic of 50 p.s.i. maximum in a high pressure pump of the stated type.

It will be seen by this description that return flow from the reaction ring chamber as the reaction ring is biased to maximum eccentricity communicates with the pump casing return line by means of governor chamber 99 which is connected to the case return line by a conduit not shown. Similarly, when the reaction ring is moved toward a concentric position by means of a high variable pressure from the governor in response to a lessening in pump demand, relief of the constant pressure from the reaction ring chamber will result from downward movement of the valve body 60 of the constant pressure valve 57 against biasing spring 69 whence the excess fluid in the chamber may flow into spring chamber 67 which similarly connects with the case return line by a conduit that is not shown on the drawing.

While particular embodiments of this invention have been illustrated and described herein, it will be apparent that various changes and modifications may be made in the construction and arrangement of the various parts without departing from the spirit and scope of this invention in its broader aspects, or as defined in the following claims.

I claim:

1. A device for producing axial motion substantially proportional to an applied fluid pressure, that is substantially temperature invariant comprising a housing; an opposed piston means in said housing; means for applying an effective hydraulic force on said piston means tending to move said piston means axially in said housing means having a temperature sensitive modulus of elasticity biasing said piston means in a direction opposite to the effective hydraulic force tending to move said piston means axially, said piston means and said housing being proportioned and comprised of different materials whereby the effective hydraulic force acting on said piston means varies with temperature changes in a manner proportional to the variation in the biasing means force due to temperature changes in the modulus of elasticity of said biasing means.

2. A device for producing axial motion substantially proportional to an applied fluid pressure irrespective of the environment operating temperature comprising a first piston and cylinder assembly of materials having substantially the same thermal coefficient of expansion; a second piston and cylinder assembly of materials having substantially the same thermal coefficient of expansion, the latter said coefficient of expansion being different from the first-mentioned coefficient of expansion; said first and second pistons being in opposed relationship; means applying a fluid pressure to said opposed pistons for producing an effective hydraulic force tending to move said pistons axially; spring means having a temperature variable modulus of elasticity biasing said pistons unidirectionally in opposition to the effective hydraulic force of the applied fluid pressure on said pistons, said piston means being dimensioned to provide with changing temperatures a change in the effective hydraulic force acting on said piston means that is proportional to the change in the force exerted by the spring biasing means due to temperature changes in the modulus of elasticity of said spring biasing means.

3. A device for producing axial motion substantially proportional to an applied pressure, that is substantially temperature invariant comprising a first piston and cylinder assembly having a first thermal coefficient of expansion; a second piston and cylinder assembly having a second thermal coefficient of expansion that is greater than said first coefficient of expansion; said first and second pistons being of unequal area and operatively interconnected in opposed axial relationship; a source of pressurized fluid, said piston and cylinder assemblies having passageway means communicating with said source of pressurized fluid for applying such fluid pressure to the opposed distal faces of said pistons and producing an effective hydraulic force on said pistons tending to move said pistons axially; a spring opposing axial movement of the piston assemblies under the applied effective hydraulic force, said pistons being dimensionally correlated to provide a reduction in the effective hydraulic force acting on the opposed pistons due to the differential expansion of said pistons that is directly proportional to and substantially equal to the decreased spring biasing force resulting from the changing modulus of elasticity of said spring with an increase in temperature.

4. A temperature compensated valve comprising a first piston and cylinder assembly having a first coefficient of thermal expansion; a second piston and cylinder assembly having a second coefficient of thermal expansion greater than the first-mentioned coefficient of expansion, said second piston having a smaller area than said first piston, with the first and second pistons operatively contacting each other in opposed relationship; means applying a fluid pressure to said opposed pistons for producing an effective hydraulic force on said pistons tending to move said pistons axially; spring means having a temperature sensitive modulus of elasticity axially biasing said pistons in opposition to the effective hydraulic force acting on said pistons due to the applied fluid pressure, the said thermal coefficients of expansion, the areas of said pistons and the said modulus of elasticity of the spring means being proportioned to provide substantially constant temperature invariant axial movement of said opposed pistons against said spring means under the action of the applied fluid pressure at elevated temperatures above a base design temperature; said first cylinder having an inlet and outlet port therein; and said first piston comprising a valve land controlling the communication of flow from the high pressure fluid inlet port to said outlet port.

5. A substantially temperature invariant device for producing axial motion proportional to an applied fluid pressure comprising a first piston and cylinder assembly of compatible materials having a similar first thermal coefficient of expansion; a second piston and cylinder assembly of compatible materials having a similar second thermal coefficient of expansion which is greater than said first thermal coefficient of expansion, said first and second pistons being in opposed relationship with the distal surfaces of said first and second pistons being in communication with a common applied fluid pressure, said second piston and cylinder being of lesser diameter than said first piston and cylinder; spring means having a temperature variable modulus of elasticity contacting the distal surfaces of said second piston and biasing it toward said first piston and in a direction opposed to the direction of the fluid force acting on the distal surface of said second piston, said first and second piston and cylinder assemblies being proportioned to provide, under the common applied fluid pressure, a net force equal to and in opposition to the temperature variable force of the temperature sensitive spring means whereby the axial motion of said device is substantially independent of temperature changes and is proportional to the applied fluid pressure.

6. A substantially temperature invariant device for producing axial motion proportional to an applied fluid pressure comprising a first piston and cylinder assembly of steel; a second piston and cylinder assembly of aluminum and having a lesser diameter than said first piston and cylinder assembly, said first and second pistons being in opposed relationship; means for applying fluid pressure to said opposed pistons for producing an effective hydraulic force on the pistons tending to move them axially; spring means having a temperature variable modulus of elasticity biasing said pistons unidirectionally in opposition to the effective hydraulic force of the fluid pressure applied to the distal surfaces of said pistons, said pistons being proportioned in relation to their different thermal coefficients of expansion to differentially expand and contract with temperature changes to provide, under the applied fluid pressure, a net piston force equal to and in opposition to the spring force at any instant whereby said device is substantially temperature invariant.

7. A device for producing axial motion substantially proportional to an applied fluid pressure and independent of temperature changes comprising a housing having colinear bores therein; an opposed piston means in said housing including a first piston in one of said colinear bores and a second piston in another of said colinear bores; means applying fluid pressure to said opposed piston means for producing an effective hydraulic force on said piston means tending to move said piston means axially; means having a temperature sensitive modulus of elasticity exerting a force to bias said piston means in an axial direction opposite to the direction of the effective hydraulic force of said applied fluid pressure, said piston means being proportioned and comprised of materials having different thermal coefficients of expansion whereby the effective hydraulic force acting on said piston means varies with temperature changes in a manner proportional to the variation in the biasing means force due to temperature changes in the modulus of elasticity of said biasing means, said colinear bores each having a coefficient of expansion substantially the same as that of the associated piston contained therein.

8. A device for producing axial motion substantially proportional to an applied fluid pressure but independent of fluid temperature changes comprising a housing having colinear bores therein; an opposed piston means in said housing including a first piston in one of said colinear bores and a second piston in another of said colinear bores, with one said opposed piston at least initially being of a greater diameter than the other opposed piston; means applying substantially equivalent fluid pressure to said opposed pistons for producing an effective hydraulic force thereon tending to move said piston means axially; means having a temperature sensitive modulus of elasticity exerting a force to bias said piston means in an axial direction opposite to the direction of the effective hydraulic force on said piston means, said piston means being proportioned and comprised of materials having different thermal coefficients of expansion whereby the effective hydraulic force acting on said piston means varies with temperature changes in a manner proportional to the variation in the biasing means force due to temperature changes in the modulus of elasticity of said biasing means; and means for allowing unrestrained expansion of said first and second opposed pistons.

9. A device for producing axial motion substantially proportional to an applied fluid pressure but independent of temperature changes comprising a housing; an opposed piston means including a first and second piston in said housing; means for applying an effective hydraulic force on said piston means tending to move said piston means axially; means having a temperature sensitive modulus of elasticity biasing said piston means in a direction opposite to the direction of the effective hydraulic force tending to move said piston means axially, said first piston being comprised of a material having a thermal coefficient of expansion $\mu_1$ and having a diameter $D_1$ and said second piston being comprised of a material having a thermal coefficient of expansion $\mu_2$ and having a diameter $D_2$, said pistons being dimensionally related by the formula $$D_2 = D_1 \sqrt{\frac{K_1 + 2\mu_1}{K_1 + 2\mu_2}}$$

wherein $K_1$ is a constant of the biasing means, said housing including first and second portions containing said first and second pistons, respectively, and having coefficients of thermal expansion related to the coefficients of thermal expansion of the pistons whereby said first and second pistons may freely expand without restraint.

References Cited in the file of this patent
UNITED STATES PATENTS

| | | |
|---|---|---|
| 2,528,739 | Carey | Nov. 7, 1950 |
| 2,568,357 | Moulden | Sept. 18, 1951 |
| 2,581,764 | Leibing | Jan. 8, 1952 |
| 2,651,999 | Harrington | Sept. 15, 1953 |
| 2,820,473 | Reiners | Jan. 21, 1958 |
| 2,838,072 | Stumm | June 10, 1958 |